(12) United States Patent
Hecker et al.

(10) Patent No.: US 8,853,334 B2
(45) Date of Patent: Oct. 7, 2014

(54) METHOD AND APPARATUS FOR DISCHARGING A POLYMER FROM A GAS-PHASE REACTOR

(75) Inventors: Manfred Hecker, Neustadt Wied (DE); Paulus-Petrus Maria De Lange, Wesseling (DE); Klaus Berhalter, Bornheim-Dersdorf (DE); Thomas Andreas Hora, Bornheim (DE); Axel Hamann, Kerpen-Horrem (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/125,777

(22) PCT Filed: Jun. 19, 2012

(86) PCT No.: PCT/EP2012/061642
§ 371 (c)(1),
(2), (4) Date: Dec. 12, 2013

(87) PCT Pub. No.: WO2012/175469
PCT Pub. Date: Dec. 27, 2012

(65) Prior Publication Data
US 2014/0114038 A1    Apr. 24, 2014

Related U.S. Application Data

(60) Provisional application No. 61/507,913, filed on Jul. 14, 2011.

(30) Foreign Application Priority Data

Jun. 21, 2011   (EP) ...................................... 11005061

(51) Int. Cl.
| | |
|---|---|
| C08F 2/34 | (2006.01) |
| B01J 8/24 | (2006.01) |
| B01J 19/24 | (2006.01) |
| B01J 8/00 | (2006.01) |
| C08F 10/00 | (2006.01) |

(52) U.S. Cl.
CPC ... *C08F 2/34* (2013.01); *B01J 8/24* (2013.01); *B01J 8/008* (2013.01); *B01J 220/00991* (2013.01); *B01J 8/003* (2013.01); *C08F 10/00* (2013.01); *B01J 2208/00274* (2013.01); *B01J 2208/00761* (2013.01); *Y10S 526/92* (2013.01)
USPC .............. 526/88; 526/920; 528/501; 422/131

(58) Field of Classification Search
USPC ....................... 526/88, 920; 422/131; 528/501
See application file for complete search history.

(56) References Cited

FOREIGN PATENT DOCUMENTS

| | | |
|---|---|---|
| JP | 2007284548 A | 11/2007 |
| WO | WO2006/082007 A1 | 8/2006 |
| WO | WO2008/015228 A2 | 2/2008 |

OTHER PUBLICATIONS

PCT International Search Report & Written Opinion mailed Jul. 31, 2012, for PCT/EP2012/061642.

*Primary Examiner* — Fred M Teskin

(57) ABSTRACT

Process and apparatus for discharging polyolefin particles from a gas-phase polymerization reactor of a pressure from 1.0 MPa to 10 MPa to a discharge vessel of a pressure from 0.1 MPa to 1.0 MPa wherein the discharging is carried out discontinuously through at least two discharge lines in which the polyolefin particles are transported horizontally or upwards.

13 Claims, 2 Drawing Sheets

METHOD AND APPARATUS FOR DISCHARGING A POLYMER FROM A GAS-PHASE REACTOR

This application is the U.S. National Phase of PCT International Application PCT/EP2012/061642, filed Jun. 19, 2012, claiming priority of European Patent Application No. 11005061.4, filed Jun. 21, 2011, and claiming the benefit under 35 U.S.C. 119(e) of U.S. Provisional Application No. 61/507,913, filed Jul. 14, 2011, the contents of which are incorporated herein by reference in their entirety.

FIELD OF THE INVENTION

The present invention relates to a process for discontinuously discharging polyolefin particles from a gas-phase polymerization reactor to a discharge vessel and it further relates to a process for polymerizing olefins at temperatures of from 30° C. to 160° C. and pressures of from 1.0 MPa to 10 MPa in the presence of a polymerization catalyst in a gas-phase polymerization reactor and to an apparatus for polymerizing olefins in the gas-phase.

BACKGROUND OF THE INVENTION

Gas-phase polymerization processes are economical processes for the polymerization of olefins such as homopolymerizing ethylene or propylene or copolymerizing ethylene or propylene with other olefins. One aspect of such a gas-phase polymerization process which needs specific attention is discharging of the produced polymer from the reactor. Various continuously or discontinuously operating methods have been developed for being able to carry out the continuous polymerization processes without severely impacting the polymerization conditions.

EP 071 430 A2 describes a fluidized-bed discharge process in which solid particulate material is transferred from the fluidized-bed reactor to lower pressure through a sequence of two settling vessels. Variants of such a discharge system are, for example, also described in EP 870 539 A2, U.S. Pat. No. 6,498,220 B2 or WO 2007/102942. WO 00/29452 A1 discloses a method of discharging polymer from a continuously operated gas-phase reactor in which polymer powder is continuously withdrawn from the reactor and which is preferably carried out in combination with batch-wise discharging polymer powder. WO 2007/071527 A1 describes a process for discharging polymer from a fluidized-bed reactor by continuously circulating polymer in a circulation loop from the base of the reactor to the upper region of the reactor and continuously withdrawing polymer from this circulation loop. WO 2006/082007 discloses discharging polymer particles from a fluidized-bed reactor via one or more product offtake lines which operate preferably discontinuously. EP 648 697 A1 refers to a method for transporting polyolefin particles from a first container to a second container by means of a pressure difference and a cleaning gas is fed to the transportation pipe for cleaning in. JP 2007/284548 A discloses a flexible transfer piping between a gas-phase polymerization reactor and a hopper which is ascending and does not have a horizontal part.

Requirements for a convenient discharging process are inter alia that the discharging shall work without disturbing the continuous polymerization process, that the discharging process as such shall not negatively influence the properties of the discharged polymer, that the process shall operate reliably over a long period of time and that the amount of discharged polymer can easily be controlled. This includes, for example, that the amount of reaction gas exiting the reactor as by-product should be as low as possible. The process shall further allow varying the amount of discharged polymer per time over a wide range. Moreover, the discharging system shall be insusceptible for deviations in the polymerization process such as for example formation of lumps or a shut-down of the polymerization process.

Thus, it was the object of the present invention to overcome the disadvantages of the prior art and to find a process for discharging particles form a gas-phase polymerization process which fulfills the requirements for a convenient discharging process and which is not too costly in its realization.

SUMMARY OF THE INVENTION

We have found that this object is achieved by a process for discharging polyolefin particles from a gas-phase polymerization reactor of a pressure from 1.0 MPa to 10 MPa to a discharge vessel of a pressure from 0.001 MPa to 1.0 MPa wherein the discharging is carried out discontinuously through at least two discharge lines in which the polyolefin particles are transported horizontally or upwards.

Furthermore, we have found a process for polymerizing olefins at temperatures of from 30° C. to 160° C. and pressures of from 1.0 MPa to 10 MPa in the presence of a polymerization catalyst in a gas-phase polymerization reactor comprising discharging the obtained polyolefin particles from the gas-phase polymerization reactor by the process for discharging polyolefin particles and an apparatus for polymerizing olefins in the gas-phase comprising a polymerization reactor, a discharge vessel and at least two pipes connecting the polymerization reactor and the discharge vessel for discharging polyolefin particles, wherein the discharge lines are constructed in a way that the polyolefin particles conveyed from the polymerization reactor to the discharge vessel are transported horizontally or upwards.

BRIEF DESCRIPTION OF THE DRAWINGS

The features and advantages of the present invention can be better understood via the following description and the accompanying drawings where.

DETAILED DESCRIPTION OF THE INVENTION

Figure 1:
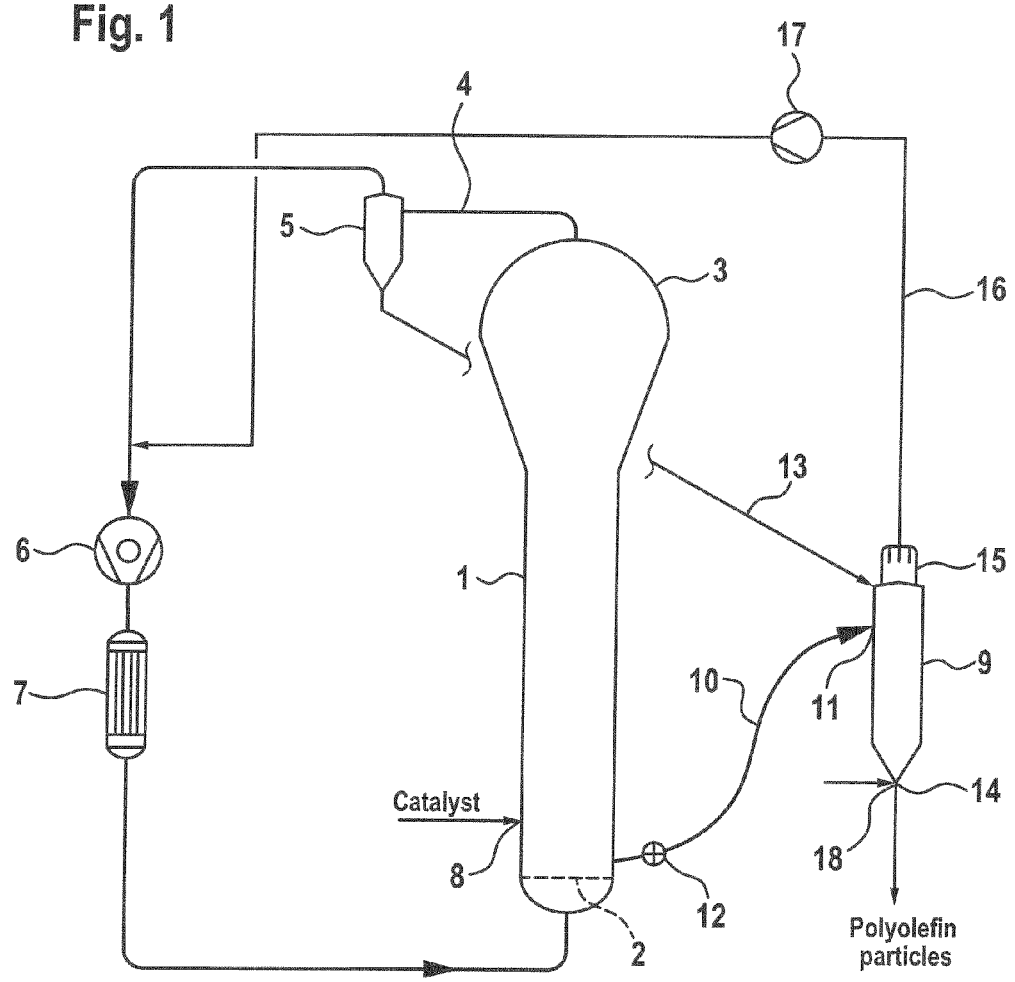
FIG. 1 shows schematically the set-up of a gas-phase fluidized-bed reactor using the process of the present invention and FIG. 2 and 3 show schematically a cross-section through a degassing vessel and a top view on a fluidized-bed reactor.

The present invention refers to a process for discharging polyolefin particles from a gas-phase polymerization reactor. Suitable reactors can be of any type commonly used for preparing polyolefins such as horizontally or vertically stirred gas-phase reactors or fluidized-bed reactors. Preference is given to fluidized-bed reactors, i.e. to reactors comprising a bed of polymerizing polymer particles which are kept in fluidized state by introducing a gas from below. This gas is then usually taken off at the upper end of the reactor, cooled to remove the heat of polymerization and recirculated back into the reactor at its lower end. When such a reactor is employed for the polymerization of olefins, the circulated reaction gas is usually a mixture of the 1-olefins to be polymerized, inert gases such as nitrogen and/or lower alkanes such as ethane, propane, butane, pentane or hexane and optionally a molecular weight regulator such as hydrogen. The use of nitrogen or propane as inert gas, optionally in combination with further lower alkanes, is preferred. The polymerization can also be carried out in a condensed or super-condensed mode, in which part of the circulating gas is cooled to below the dew point and returned to the reactor separately as a liquid and a gas phase or together as a two-phase mixture in order to make additional use of the enthalpy of vaporization for cooling the reaction gas.

The gas-phase polymerization reactors of the present invention are operated at pressures of from 1.0 MPa to 10 MPa, preferably from 1.2 MPa to 8 MPa and in particular from 1.5 MPa to 4 MPa. The polymerization is advantageously carried out at temperatures of from 30° C. to 160° C., particularly preferably from 65° C. to 125° C., with temperatures in the upper part of this range being preferred for copolymers of relatively high density and temperatures in the lower part of this range being preferred for copolymers of lower density.

Polyolefins, which can be discharged by the process of the present invention, are preferably obtained by polymerizing 1-olefins, i.e. hydrocarbons having terminal double bonds, without being restricted thereto. Suitable monomers can be functionalized olefinically unsaturated compounds such as ester or amide derivatives of acrylic or methacrylic acid, for example acrylates, methacrylates, or acrylonitrile. Preference is given to nonpolar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and non-conjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins. The polyolefins are in particular homopolymers or copolymers of ethylene or propylene. As comonomers in ethylene copolymers, preference is given to $C_3$-$C_8$-1-alkenes, in particular 1-butene, 1-pentene, 1-hexene and/or 1-octene in amounts of up to 40 wt.-%. As comonomers in propylene copolymers, preference is given to ethylene and/or 1-butene in amounts of up to 40 wt.-% of. Particularly preferred polyolefins are ethylene copolymers with 1-hexene and/or 1-butene as comonomer in amounts of up to 20 wt.-%.

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are catalysts of the Phillips type, which are preferably prepared by applying a chromium compound to an inorganic support and subsequently calcinating this at temperatures in the range from 350° C. to 950° C., resulting in chromium present in valences lower than six being converted into the hexavalent state. Apart from chromium, further elements such as magnesium, calcium, boron, aluminum, phosphorus, titanium, vanadium, zirconium or zinc can also be used. Particular preference is given to the use of titanium, zirconium or zinc. Combinations of the abovementioned elements are also possible. The catalyst precursor can be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or pre-reduced. The pre-reduction is usually carried out by means of carbon monoxide or else by means of hydrogen at 250° C. to 500° C., preferably at 300° C. to 400° C., in an activator.

Depending on the catalyst used, the obtained polyolefin particles usually have a mean size of from a few hundred to a few thousand microns. In the case of chromium catalysts, the particles have a mean size of from about 400 µm to 600 µm, and in the case of Ziegler catalysts the mean particle size is from about 1500 µm to 2000 µm.

According to the present invention the polyolefin particles are discharged to a discharge vessel of a pressure of from 0.001 MPa to 1.0 MPa, preferably of a pressure of from 0.1 MPa to 0.5 MPa and more preferably of a pressure of from 0.11 MPa to 0.3 MPa. In the degassing vessel, the polymer particles are separated from the major part of the concomitantly discharged reaction gas. Furthermore, the polymer particles are also degassed. That means, caused by the drop in pressure, the particles release non-reacted monomers and other components of the reaction gas, which either adhere to the polyolefin particles or are dissolved in them. Especially in the case of copolymerization of ethylene with further 1-olefins such as 1-butene or 1-hexene, considerable amounts of the comonomers remain in the particles. For improving the degassing process, an inert gas is usually fed to the bottom of the discharge vessel. Low-molecular weight gases which are anyway present in the reaction gas such as, depending on the type of polymerization, nitrogen or propane or low-molecular weight monomers such as ethylene are preferred for this purpose. Usually the gases withdrawn from the discharge vessel are compressed and recycled to the polymerization reactor.

The discharging of the polyolefin particles is carried out discontinuously through at least two discharge lines. Discharging discontinuously discharge brings about the advantage that reaction gas is exiting the polymerization reactor only for relatively short periods of time. Accordingly, the amount of reaction gas discharged together with the polyolefin particles is limited. Furthermore, a high amount of polymer per time unit is discharged in the time period when discharging occurs. That means the applied forces during the discharging period are relatively high so that the risk of blockage of the discharge line is reduced. Furthermore, also the fact that the pressure difference between the polymerization reactor and the discharge vessel is much higher than needed for as simple conveyance of the polymer particles drastically reduces the probability of a blockage of the discharge line. However, even in case that such a blockage has occurred, the presence of at least one further discharge line allows continuing the polymerization in the polymerization reactor without being forced to shut-down the process during the time period in which the blocked discharge line is cleaned. Furthermore, the existence of two or more discharge lines allows limiting the quantity of polyolefin to be discharged in one "shot", i.e. one period of time in which discharging occurs in one discharge line. This reduces the risk of melting or partly melting of the particles during discharging or the risk of impairing the properties of the produced polyolefins since discharging of polyolefin particles always causes friction between the particles or between the particles and the wall and is accordingly associated with a temperature increase. If there are smaller amounts of polyolefin particles discharged in one "shot" the temperature increase is less pronounced. Moreover, discharging too high amounts of polyolefin particles in one "shot" may also result in fluctuations of the filling level of the reactor causing instabilities in the polymerization behavior or even in a complete emptying of the reactor. Accordingly, the number of discharging lines is preferably from 2 to 8, more preferably from 3 to 6 and especially preferred 3 or 4.

The discharge lines are constructed in a way that the polyolefin particles are transported horizontally or upwards and preferably only upwards. Arranging the pipes for discharging the polyolefins particles in such manner avoids that larger quantities of the polyolefin particles remain in the discharge line between the discharge "shots" and accordingly minimizes the risk that the polyolefins particles continue to grow in the pipe and possibly fully or at least partly block it since the catalyst in the polyolefin particles entering the discharge line is still active and monomer is present. Moreover, such an arrangement of the discharge lines allows erecting the polymerization reactor and the discharge vessel at the same level. The pipes are usually equipped with a valve, preferably a ball valve, for closing the pipes as long as no discharging occurs in the specific pipe. These valves are preferably located near the entrance of the discharge line in the proximity of the polymerization reactor. In preferred embodiments of the present invention of polymerization reactors of commercial scale the distance of the ball valve to the outer wall of the polymerization reactor is in the range from 0 m to 3.5 m, preferably from 0 m to 2.5 m and more preferably from 0 m to 2 m.

Preferred pipes for discharging the polyolefin particles do not have a sharp bend. Otherwise there is a high chance that polyolefin particles adhere in the corners and start growing. Moreover, sharp bending also increases the friction between the polyolefin particles and the pipe walls. Especially preferred the curvature of the bending of the discharge lines has a ratio R/D of at least 20, more preferred of at least 25 and in particular of at least 30, with R being the radius of curvature and D being the inner diameter of the discharge line.

In a preferred embodiment of the present invention the diameter of the discharge lines is not constant over the whole length and the section of the discharge lines, which is attached to the reactor, has a smaller diameter than the remainder of the discharge lines, which has its nominal diameter. The reduction of the inner diameter in the tapered section of the discharge lines is usually from 5% to 50%, more preferably from 10% to 30% and especially from 15% to 25% with respect to the nominal diameter of the discharge lines. Preferably the tapered section of the discharge lines is the part of the lines from the reactor to the ball valves for closing the discharge lines. The length of the tapered section is usually not more than 3.5 m, preferably not more than 2.5 m and more preferably not more than 2 m and is usually at least 0.05 m. It is however also possible that the ball valve is mounted flush to the wall of the gas-phase polymerization reactor and the section of the discharge lines with the reduced diameter is only the bore in the valve ball. Such a tapered section of the discharge lines at the reactor brings about the advantages that the region with the smaller diameter reduces the amount of reactor gas which is carried out during discharging while the otherwise larger diameter of the discharge lines results in lower velocities of the polyolefin particles with less friction and an accordingly reduced risk of melting of the particles or impairing the product properties.

In a preferred embodiment of the present invention the discharge lines enter the discharge vessel tangentially. This creates a circular flow in the discharge vessel which helps separating the polyolefin particles, which settle at the bottom of the discharge vessel, from the concomitantly discharged reaction gas, which exits the discharge vessel at the top. Preferably the gas exit of the discharge vessel is further equipped with a filter unit. The discharge lines can enter the discharge vessel at different heights. For saving volume of the discharge vessel, preferably two or more discharge lines enter the discharge vessel at the same height. In such a case all discharge lines can enter the discharge vessel in a way that all entering streams circulate in the same direction in the discharge vessel. However, that requires that at least some of the discharge lines have a large amount of bending. In a preferred arrangement of the discharge lines the flow of the polymer particles entering the discharge vessel from one discharge line is countercurrent to the flow of the polymer particles entering the discharge lines from another discharge line because such an arrangement allows the shortest discharge lines and the lowest amount of bending. More preferably the discharge lines are arranged in a way that always two discharge lines enter the discharge vessel at the same height and the two lines are arranged causing countercurrent flow.

For avoiding in such an arrangement that the particles exiting one line enter the respective opposite line, it is preferred that the discharge vessel is equipped with a deflection plate between the inlets of two discharge lines providing the discharge vessel with polymer particles of countercurrent flow. Since the deflection plate should be large enough to divert all entering polyolefin particles the deflection plate preferably extends at least 1 m, more preferable at least 2 m and in particular at least 3 m upwards and downwards from the entry of the respective discharge lines. Furthermore, the deflection plate preferable extend so far into the discharge vessel that the distance between the inner edge of the deflection plate and the wall of the discharge vessel is at least 30% of the diameter of the discharge vessel. It is further preferred that the deflection plate is mounted flush to the wall of the discharge vessel, i.e. there is no angle between wall and deflection plate. Moreover, preferably the volume behind the deflection plate should be covered at least from the top to avoid that polyolefin particle can become stuck.

In a preferred embodiment of the present invention the discharge lines are exiting the gas-phase polymerization reactor at the same height, preferably within about 1 m from the bottom of the gas-phase polymerization reactor or, in case of a fluidized-bed reactor, from the distribution plate of the reactor to allow a relatively easy emptying of the reactor. Arranging the discharge lines in a way that they exit the gas-phase polymerization reactor at the same height makes sure that the composition of the polyolefin particle discharge through the different discharge lines is as equal as possible. Furthermore, discharging at the bottom of the reactor also brings the advantage that the bed density is higher.

In a preferred embodiment of the present invention the injection point for the catalyst is at the opposite side of the polymerization reactor with respect to the exit points of the discharge lines. That means the exit points of the discharge lines are arranged on one semicircle of a cross-section through a cylindrical polymerization reactor while the injection point for the catalyst is arranged in the middle of the other semicircle of the cross-section through the polymerization reactor. Preferably the injection point for the catalyst is however located at a different height of the polymerization reactor, e.g. for a fluidized-bed reactor, at a height of about 1.5 m to 2 m from the distribution plate of the reactor.

Usually the opening time of the valve in the discharge lines is from 1 s to 10 s, preferably from 2 s to 8 s and more preferably from 3 s to 5 s. The frequency of the discharge operations depends on the throughput, the number of discharge lines and the sizing of the discharge lines. Preferably the subsequent discharging operations start in an individual discharge line every 2 s to 10 min, more preferably every 5 s to 5 min and in particular every 10 s to 1 min. Accordingly, time periods, in which discharging takes place, alternate with time periods, in which no discharging is carried out. Usually all discharge lines, which are installed at one polymerization reactor, are operated for discharging from that polymerization reactor. That means, after one discharge line has been used for discharging, usually another discharge line is taken for the next discharge shot and a further one for the shot thereafter until all discharge line have been used and the sequence starts again.

The present invention further relates to a process for polymerizing olefins at temperatures of from 30° C. to 160° C. and pressures of from 1.0 MPa to 10 MPa in the presence of a polymerization catalyst in a gas-phase polymerization reactor comprising discharging the obtained polyolefin particles from the gas-phase polymerization reactor as described above.

Another aspect of the present invention is an apparatus for polymerizing olefins in the gas-phase comprising a polymerization reactor, a discharge vessel and at least two pipes connecting the polymerization reactor and the discharge vessel for discharging polyolefin particles, wherein the discharge lines are constructed in a way that the polyolefin particles conveyed from the polymerization reactor to the discharge vessel are transported horizontally or upwards. Preferably the pipes for discharging the polyolefin particles discharge lines are equipped with a valve. It is further preferred that the curvature of the bending of the discharge lines has a ratio R/D of at least 20, more preferred of at least 25 and in particular of at least 30 with R being the radius of curvature and D being the inner diameter of the discharge line. Preferably the diameter of the discharge lines is not constant over the whole length and the section of the discharge lines, which is attached to the reactor, has a smaller diameter than the remainder of the discharge lines, which has its nominal diameter. The reduction of the inner diameter in the tapered section of the discharge lines is usually from 5% to 50%, more preferably from 10% to 30% and especially from 15% to 25% with respect to the nominal diameter of the discharge lines. Preferably the tapered section of the discharge lines is the part of the lines from the reactor to the ball valves for closing the discharge lines. The length of the tapered section is usually not more than 3.5 m, preferably not more than 2.5 m and more preferably not more than 2 m and is usually at least 0.05 m. It is however also possible that the ball valve is mounted flush to the wall of the gas-phase polymerization reactor and the section of the discharge lines with the reduced diameter is only the bore in the valve ball.

According to a favorable embodiment of the apparatus of the present invention the discharge lines enter the discharge vessel tangentially. More preferably the discharge vessel is equipped with a deflection plate between the inlets of two discharge lines, which are arranged in a way that the flow of the polymer particles entering the discharge vessel from one discharge line is countercurrent to the flow of the polymer particles entering the discharge lines from another discharge line. It is also preferred that the discharge lines are exiting the gas-phase polymerization reactor at the same height.

FIG. 1 shows schematically the set-up of a gas-phase fluidized-bed reactor using the process of the present invention. The gas-phase fluidized-bed reactor (1) comprises a cylindrical tube in which the bed of polymerizing polyolefin particles, which are kept in fluidized state by introducing a gas from below through distribution plate (2) is located. At the top, the cylindrical part gives usually way to a widening disengagement zone (3) which reduces the discharge of particles from the reactor (1). The reaction gas leaves the reactor (1) at the upper end of the disengagement zone (3) and is conveyed in the recycle gas line (4) via a cyclone (5) to the compressor (6) and from there via a heat exchanger (7), in which the recycle gas is cooled, back to the reactor (1). The recycle gas can, if appropriate, be cooled to below the dew point of one or more of the recycle gas components in the heat exchanger so as to operate the reactor with condensed material, i.e. in the condensed mode. Catalyst is introduced into reactor (1) at position (8).

The polyolefin particles are transferred from the reactor (1) to the discharge vessel (9) by at least two discharge lines (10) at positions (11). The discharge lines (10) are equipped with valves (12), which allow starting the discharging operation by opening and ending it again by closing. Curve (10) displayed in FIG. 1 represents two discharge lines, which both exit the reactor at the same height and also enter the discharge vessel (9) at the same height. In an alternative preferred embodiment of the set-up (not shown in FIG. 1) four discharge lines exit the reactor at the same height and enter the discharge vessel (9) at two different heights. Discharge lines (10) are constructed with low curvature and without sharp bends. The polyolefin particles separated from the reaction gas in cyclone (5) are also transferred to the discharge vessel (9) via line (13).

The polyolefin particles leave the discharge vessel (9) at the bottom in position (14). The reaction gas separated from the polyolefin particles exits the discharge vessel (9) at the top, passes a filter unit (15) and is conveyed through line (16) via to the compressor (17) and from there to the recycle gas line (4) downstream of the cyclone (5).

For improving the degassing, an inert gas, such as nitrogen or propane or a monomer like ethylene, is further fed to the discharge vessel (9), preferably at a position (18) at the bottom of the discharge vessel (9).

Figure 2:
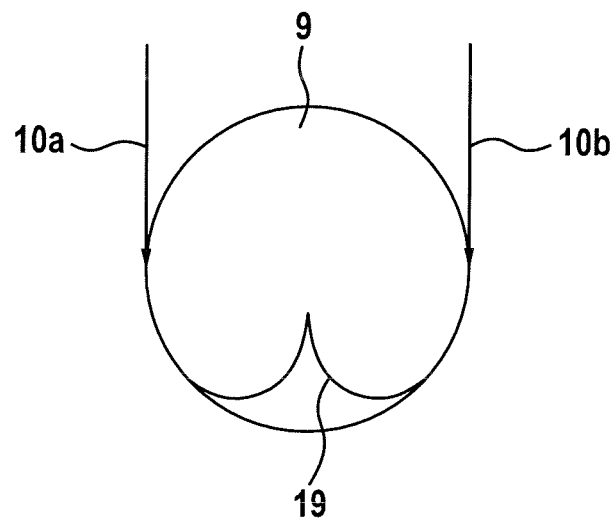

FIG. 2 shows schematically the cross-section through the degassing vessel (9) at the height of position (11). The two discharge lines (10a) and (10b) enter the degassing vessel (9) tangentially at same height in a way that the flow of the polymer particles entering the discharge vessel from one discharge line is countercurrent to the flow of the polymer particles entering the discharge lines from another discharge line. Furthermore, a deflection plate (19) is installed in the discharge vessel (9) between the inlets of two discharge lines providing the discharge vessel (10a) and (10b).

Figure 3:
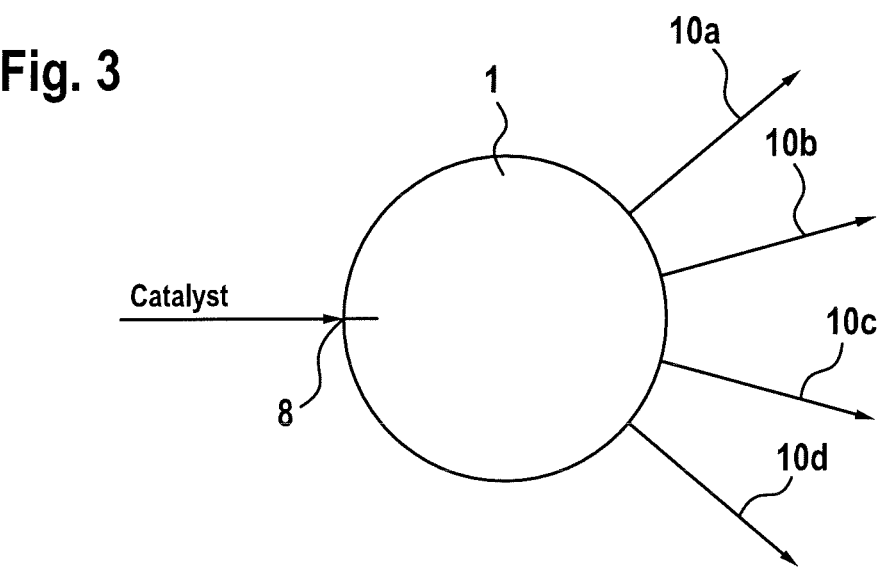

FIG. 3 shows very schematically a top view of a set-up for a preferred gas-phase fluidized-bed reactor with four discharge lines (not shown in FIG. 1) in which catalyst is introduced into the fluidized-bed reactor (1) at position (8) and four discharge lines (10*a* to 10*d*) exit the reactor at the opposite side of the polymerization reactor with respect to the injection point of the catalyst.

What is claimed is:

1. A process for discharging polyolefin particles from a gas-phase polymerization reactor of a pressure from 1.0 MPa to 10 MPa to a discharge vessel of a pressure from 0.001 MPa to 1.0 MPa wherein the discharging is carried out discontinuously through at least two discharge lines in which the polyolefin particles are transported horizontally or upwards
   wherein the discharge lines have a curvature according to a ratio R/D of at least 20, with R being the radius of the curvature and D being the inner diameter of the discharge line.

2. A process according to claim 1, wherein the section of the discharge lines, which is attached to the reactor, has a smaller diameter than the remainder of the discharge lines.

3. A process according to claim 1, wherein the discharge lines enter the discharge vessel tangentially.

4. A process according to claim 3, wherein the flow of the polymer particles entering the discharge vessel from one discharge line is countercurrent to the flow of the polymer particles entering the discharge vessel from another discharge line.

5. A process according to claim 4, wherein the discharge vessel is equipped with a deflection plate between the inlets of two discharge lines providing the discharge vessel with polymer particles of countercurrent flow.

6. A process according to claim 1, wherein the discharge lines are exiting the gas-phase polymerization reactor at the same height.

7. A process for polymerizing olefins at temperatures of from 30° C. to 160° C. and pressures of from 1.0 MPa to 10 MPa in the presence of a polymerization catalyst in a gas-phase polymerization reactor comprising discharging the obtained polyolefin particles from the gas-phase polymerization reactor by a process according to claim 1.

8. An apparatus for polymerizing olefins in the gas-phase comprising a polymerization reactor, a discharge vessel and at least two pipes connecting the polymerization reactor and the discharge vessel for discharging polyolefin particles, wherein the discharge lines are constructed in a way that the polyolefin particles conveyed from the polymerization reactor to the discharge vessel are transported horizontally or upwards,
   wherein the discharge lines have a curvature according to a ratio R/D of at least 20, with R being the radius of the curvature and D being the inner diameter of the discharge line.

9. An apparatus for polymerizing olefins according to claim 8, wherein the pipes for discharging the polyolefin particles discharge lines are equipped with a valve.

10. An apparatus for polymerizing olefins according to claim 8, wherein the section of the discharge lines, which is attached to the reactor, has a smaller diameter than the remainder of the discharge lines.

11. An apparatus for polymerizing olefins according to claim 8, wherein the discharge lines enter the discharge vessel tangentially.

12. An apparatus for polymerizing olefins according to claim 8, wherein the discharge vessel is equipped with a deflection plate between the inlets of two discharge lines, which are arranged in a way that the flow of the polymer particles entering the discharge vessel from one discharge line is countercurrent to the flow of the polymer particles entering the discharge vessel from another discharge line.

13. An apparatus for polymerizing olefins according to claim 8, wherein the discharge lines are exiting the gas-phase polymerization reactor at the same height.

* * * * *